US008652982B2

(12) United States Patent
Motoya et al.

(10) Patent No.: US 8,652,982 B2
(45) Date of Patent: Feb. 18, 2014

(54) CERAMIC SINTERED BODY AND METHOD FOR PRODUCING CERAMIC SINTERED BODY

(75) Inventors: Machiko Motoya, Nagaokakyo (JP); Takahiro Sumi, Nagaokakyo (JP); Tsuyoshi Katsube, Nagaokakyo (JP); Yoichi Moriya, Nagaokakyo (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/567,655

(22) Filed: Aug. 6, 2012

(65) Prior Publication Data
US 2012/0329633 A1 Dec. 27, 2012

Related U.S. Application Data

(63) Continuation of application No. PCT/JP2011/051985, filed on Feb. 1, 2011.

(30) Foreign Application Priority Data

Feb. 10, 2010 (JP) ................................ 2010-027550

(51) Int. Cl.
*C04B 35/00* (2006.01)
(52) U.S. Cl.
USPC ............................ 501/128; 501/134; 501/153
(58) Field of Classification Search
USPC .................. 501/126, 127, 128, 134, 153, 154
See application file for complete search history.

(56) References Cited

U.S. PATENT DOCUMENTS

| 8,173,565 B2 * | 5/2012 | Katsube ........................ 501/135 |
| 2010/0139957 A1 * | 6/2010 | Motoya et al. ................. 174/257 |

FOREIGN PATENT DOCUMENTS

| JP | 2002-173362 A | 6/2002 | |
| JP | 2006-001755 A | 1/2006 | |
| JP | 2008-044829 A | 2/2008 | |
| JP | 2008-053525 A | 3/2008 | |
| WO | WO/2009/025156 | * 2/2009 | ............ C04B 35/195 |
| WO | WO-2009-025156 A1 | 2/2009 | |

OTHER PUBLICATIONS

Written Opinion of the International Searching Authority, mailed Apr. 26, 2011.

* cited by examiner

*Primary Examiner* — Noah Wiese
(74) *Attorney, Agent, or Firm* — Dickstein Shapiro LLP

(57) ABSTRACT

Provided is a mono- or multilayer ceramic substrate which exhibits a high flexural strength. The substrate contains a sintered ceramic which includes respective crystal phases of quartz, alumina, fresnoite, sanbornite, and celsian, in which the relationship between the diffraction peak intensity A in the (201) plane of the fresnoite and the diffraction peak intensity B in the (110) plane of the quartz, measured by a powder X-ray diffractometry in the range of the diffraction peak angle $2\theta=10$ to $40°$, is $A/B \geq 2.5$. The fresnoite crystal phase preferably has an average crystal grain size of 5 μm or less. In firing to obtain this ceramic sintered body, the maximum temperature falls within the range of 980 to 1000° C.

8 Claims, 1 Drawing Sheet

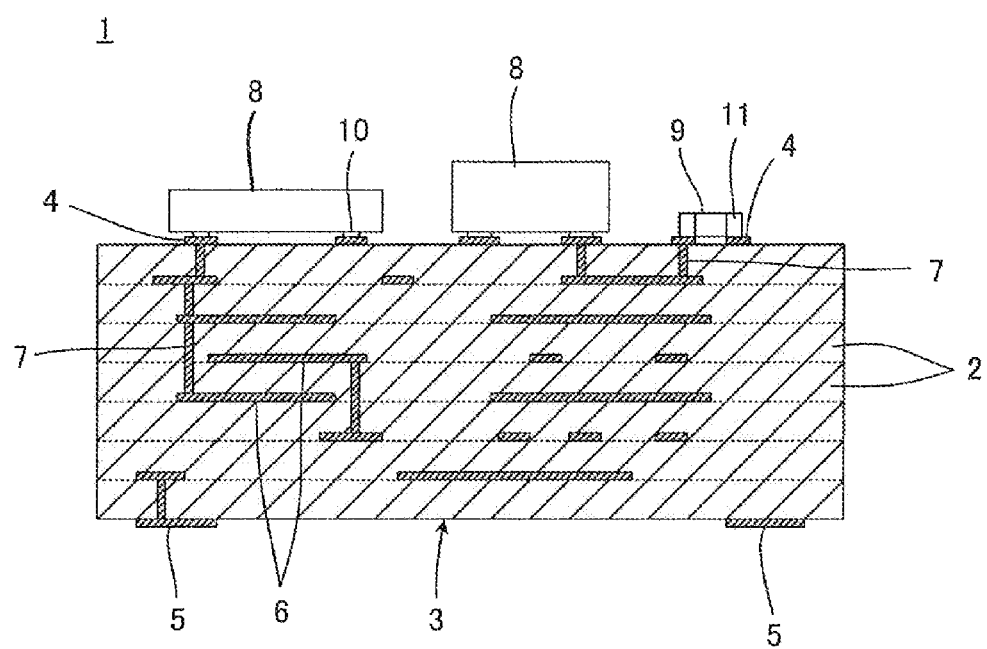

US 8,652,982 B2

CERAMIC SINTERED BODY AND METHOD FOR PRODUCING CERAMIC SINTERED BODY

This is a continuation of application Ser. No. PCT/JP2011/051985, filed Feb. 1, 2011, the entire contents of which is incorporated herein by reference.

TECHNICAL FIELD

This invention relates to a ceramic sintered body and a method for producing the ceramic sintered body, and more particularly, relates to a ceramic sintered body obtained by firing a non-glass low-temperature cofired ceramic material, and a method for producing the ceramic sintered body.

BACKGROUND ART

A ceramic sintered body of interest to this invention is obtained by forming a low-temperature cofired ceramic (LTCC: Low Temperature Cofired Ceramic) material into a predetermined shape, and firing the material.

The low-temperature cofired ceramic material can be fired simultaneously with low melting point metal materials such as silver and copper, which are relatively low in specific resistance, thus form multilayer ceramic substrates which have excellent high frequency characteristics, and have been frequently used as, for example, a substrate material for high-frequency modules in information-communication terminals.

So-called glass-ceramic composite systems are common as the low-temperature cofired ceramic in which a $B_2O_3$—$SiO_2$ based glass material is mixed with a ceramic material such as $Al_2O_3$. However, these systems require the use of a relatively expensive glass material as a starting raw material, and contain boron which is likely to volatilize during firing, and the compositions of substrates obtained are thus likely to vary. Therefore, the production processes have complications, such as the need to use a special setter for controlling the volatilization volume of boron.

Low-temperature cofired ceramic materials have been proposed which are disclosed in, for example, Japanese Patent Application Laid-Open No. 2002-173362 (Patent Document 1), Japanese Patent Application Laid-Open No. 2008-044829 (Patent Document 2), Japanese Patent Application Laid-Open No. 2008-053525 (Patent Document 3), and International Publication WO 2009/025156 (Patent Document 4). The low-temperature cofired ceramic materials disclosed in these references, for which the starting raw materials contain no glass, are moreover non-glass low-temperature cofired ceramic materials containing no boron, and thus, do not encounter the problem described above.

However, the ceramic sintered bodies obtained by sintering of the low-temperature cofired ceramic materials disclosed in these references may fail to achieve desirable strength properties, because of their small fracture toughness values.

PRIOR ART PATENT DOCUMENTS

Patent Document 1: Japanese Patent Application Laid-Open No. 2002-173362
Patent Document 2: Japanese Patent Application Laid-Open No. 2008-044829
Patent Document 3: Japanese Patent Application Laid-Open No. 2008-053525
Patent Document 4: International Publication WO 2009/025156

DISCLOSURE OF THE INVENTION

Problem to be Solved by the Invention

Therefore, an object of this invention is to provide a ceramic sintered body which can be produced inexpensively and easily without using glass as a starting raw material, and moreover has a large fracture toughness value.

Another object of this invention is to provide a method for producing the ceramic sintered body mentioned above.

Means for Solving the Problem

A ceramic sintered body according to this invention, which includes respective crystal phases of quartz, alumina, fresnoite, sanbornite, and celsian, is characterized in that the relationship between the diffraction peak intensity A in the (201) plane of the fresnoite and the diffraction peak intensity B in the (110) plane of the quartz, measured by a powder X-ray diffractometry in the range of the diffraction peak angle $2\theta=10$ to $40°$, is $A/B \geq 2.5$.

In the ceramic sintered body according to this invention, the fresnoite crystal phase preferably has an average crystal grain size of 5 μm or less.

The ceramic sintered body according to this invention is preferably obtained by sintering of a non-glass low-temperature cofired ceramic material including: a main constituent ceramic material containing an Si oxide, a Ba oxide, and an Al oxide; and an accessory constituent ceramic material containing an Mn oxide and a Ti oxide, and substantially containing no Cr oxide or B oxide.

This invention is also directed to a method for producing a ceramic sintered body.

In the method for producing a ceramic sintered body according to this invention, ceramic green sheets are first prepared which include a non-glass low-temperature cofired ceramic material including: a main constituent ceramic material containing a Si oxide, a Ba oxide, and an Al oxide; and an accessory constituent ceramic material containing a Nn oxide and a Ti oxide, and substantially containing no Cr oxide and B oxide.

Next, the multiple ceramic green sheets are stacked to prepare a raw laminated body, and the raw laminated body is then subjected to firing. This invention is characterized in that the maximum temperature is selected from the range of 980 to 1000° C. in the firing step.

Advantageous Effect of the Invention

In the case of the ceramic sintered body according to this invention, the fracture toughness value can be increased as a result of controlling the crystal precipitation of quartz and fresnoite as described above, and when this ceramic sintered body is used to constitute a ceramic substrate, a ceramic substrate which has a high flexural strength can be achieved.

In the ceramic sintered body according to this invention, when fine-grained crystals are present in such a way that the fresnoite crystal phase has an average crystal grain size of 5 μm or less, the number of crystal grain boundaries is increased, thereby making it possible to suppress crack development. Therefore, when this ceramic sintered body is used to constitute a substrate, a ceramic substrate which has a high flexural strength, such as 320 MPa or more, can be achieved.

The method for producing a ceramic sintered body according to this invention allows the fresnoite precipitation to be controlled by controlling the maximum temperature for the firing. Therefore, in the case of the obtained ceramic sintered body, the crystal precipitation ratio between quartz and fresnoite can be controlled, and as a result, the fracture toughness value can be increased, and when this ceramic sintered body is used to constitute a ceramic substrate, a ceramic substrate can be achieved which has a high flexural strength.

BRIEF EXPLANATION OF DRAWING

FIG. 1 is a cross-sectional view schematically illustrating a multilayer ceramic substrate 1 configured with the use of a ceramic sintered body according to this invention.

BEST MODE FOR CARRYING OUT THE INVENTION

A first feature of a ceramic sintered body according to this invention is to include respective crystal phases of quartz ($SiO_2$), alumina ($Al_2O_3$), fresnoite ($Ba_2TiSi_2O_8$), sanbornite ($BaSi_2O_5$), and celsian ($BaAl_2Si_2O_8$).

This ceramic sintered body is obtained by sintering of, for example, a non-glass low-temperature cofired ceramic material described below. In this case, the starting raw materials contain substantially no glass component, while the sintered body itself has an amorphous portion in addition to the respective crystal phases mentioned above. This is because when the non-glass low-temperature cofired ceramic material is subjected to firing, the starting raw materials are partially vitrified.

The ceramic sintered body according to this invention has the respective crystal phases of quartz, alumina, and fresnoite as main crystal phases, and thus can achieve a ceramic sintered body with a small relative permittivity $\in_r$ of 10 or less, which is suitable for ceramic layers constituting substrates for high frequencies. Moreover, because of the high joint strength of the ceramic sintered body with an external conductor film, the electrode peel strength is improved to make problems, such as dropping of surface-mounted components, less likely to occur.

The ceramic sintered body according to this invention has the respective crystal phases of sanbornite and celsian further precipitated as described above. This precipitation of even sanbornite and celsian crystal phases will lead to the presence of a variety of crystal phases, and as a result, the crystal structure of the sintered body will be made heterogeneous, and even if the sintered body is cracked, the extension of the crack can be suppressed.

The ceramic sintered body according to this invention has a second feature that the relationship between the diffraction peak intensity A in the (201) plane of the fresnoite and the diffraction peak intensity B in the (110) plane of the quartz, measured by a powder X-ray diffractometry in the range of the diffraction peak angle 2θ=10 to 40°, is A/B≥2.5. This second feature can increase the fracture toughness value of the ceramic sintered body, and when this ceramic sintered body is used to constitute a ceramic substrate, a ceramic substrate can be achieved which has a high flexural strength.

In the ceramic sintered body according to this invention, the fresnoite crystal phase preferably has an average crystal grain size of 5 μm or less. More specifically, the presence of such a fine crystal phase at a predetermined ratio increases the number of crystal grain boundaries, and thus, even if the sintered body is cracked, the extension of the crack can suppressed.

The ceramic sintered body according to this invention is preferably obtained by sintering of a non-glass low-temperature cofired ceramic material including a main constituent ceramic material containing an Si oxide, a Ba oxide, and an Al oxide; and an accessory constituent ceramic material containing an Mn oxide and a Ti oxide, but substantially no Cr oxide and B oxide.

This low-temperature cofired ceramic material substantially contains no B oxide (and in particular, $B_2O_3$) because no glass is used as a starting raw material. Thus, the variation in composition can be reduced when the material is subjected to firing, and the management of the firing process can be facilitated, such as the fact there is no need to use any special setter. In addition, the low-temperature cofired ceramic material substantially contains no Cr oxides (and in particular, $Cr_2O_3$), and thus can suppress the decrease in Qf value at high-frequency bands typified by a microwave band, and achieve a Qf value of 1000 or more at 3 GHz, for example.

The low-temperature cofired ceramic material described above can be, for example, a main constituent ceramic material containing 48 to 75 weight % of Si in terms of $SiO_2$, to 40 weight % of Ba in terms of BaO, and 5 to 20 weight % of Al in terms of $Al_2O_3$, and includes an accessory constituent ceramic material containing 2 to 10 parts by weight of Mn in terms of MnO and 0.1 to 10 parts by weight of Ti in terms of $TiO_2$ with respect to 100 parts by weight of the main constituent ceramic material.

In this case, the main constituent ceramic material serves as a basic constituent for the ceramic sintered body obtained, and contributes significantly to the achievement of a ceramic sintered body which has a high insulation resistance, a low relative permittivity $\in_r$, and a low dielectric loss.

On the other hand, the Mn (in particular, MnO) for the accessory constituent ceramic material is likely to react with the $SiO_2$—BaO—$Al_2O_3$ based main constituent material to produce a liquid phase component, and acts as a sintering aid by reducing the viscosity of the starting raw material during firing, but has much lower volatility as compared with $B_2O_3$ which also acts as a sintering aid. Therefore, the Mn reduces the firing variation, makes it easy to manage the firing process, and contributes to an improvement in mass productivity.

In addition, the increased additive amount of Ti (in particular, $TiO_2$) for the accessory constituent ceramic material further increases the A/B ratio described above, thus making it possible to further increase the fracture toughness value of the ceramic sintered body.

In addition, the Ti (in particular, $TiO_2$) can, although the detailed mechanism is not known, increase the reactivity of a ceramic layer composed of the low-temperature cofired ceramic material with an external conductor film composed of a low melting point metal material such as copper, and through the co-firing process, increase the joint strength between the sintered body and the conductor film, that is, the joint strength between the ceramic layer and the external conductor film. As a result, strong soldered joints are formed between active elements such as semiconductor devices or passive elements such as chip capacitors, which are mounted on a multilayer ceramic substrate, and the multilayer ceramic substrate, thus making it possible to suppress junctional disruption caused by impacts such as a fall of the substrate.

Further, the low-temperature cofired ceramic material may further contain Fe (in particular, $Fe_2O_3$) as an accessory constituent ceramic material. In this case, as for the content of the Fe, the total amount of the Fe oxide and Ti oxide is preferably 0.1 to 10 parts by weight with respect to 100 parts by weight of the main constituent ceramic material. This Fe also can increase the reactivity of the ceramic layer with the external conductor film, and through the co-firing process, increase the joint strength between the sintered body and the conductor film, that is, the joint strength between the ceramic layer and the external conductor film.

The low-temperature cofired ceramic material preferably contains no alkali metal oxides such as $Li_2O$ and $Na_2O$. This is because these alkali metal oxides also readily volatilize during firing, as is in the case of $B_2O_3$, and may cause variations in the composition of a substrate obtained. Furthermore, as long as these alkali metal oxides are not present, the environment resistance against high temperatures, high humidity, etc., is improved, and the chemical resistance can be also improved such as an ability to suppress elution into a plating solution.

The low-temperature cofired ceramic material preferably further contains, as an accessory constituent ceramic material, 0.1 to 5 parts by weight of Mg in terms of MgO with respect to 100 parts by weight of the main constituent ceramic material. The Mg (in particular, MgO) promotes the crystallization of the low-temperature cofired ceramic material during firing, and as a result, can reduce the volume of a liquid phase portion which causes a decrease in substrate strength, and thus further improve the bending strength of a ceramic sintered body obtained.

In addition, the low-temperature cofired ceramic material preferably further contains, as an accessory constituent ceramic material, 0.1 to 6 parts by weight of at least one selected from Nb, Zr, and Zn, respectively in terms of $Nb_2O_5$, $ZrO_2$, and ZnO, with respect to 100 parts by weight of the main constituent ceramic material. The at least one selected from Nb, Zr, and Zn (in particular, at least one oxide selected from $Nb_2O_5$, $ZrO_2$, and ZnO) can reduce the additive amount of Mn (in particular, MnO) which is likely to remain as an amorphous component, and as a result, reduce the volume of a liquid phase portion which causes a decrease in substrate strength, and thus further improve the bending strength of a multilayer ceramic substrate obtained.

In addition, the low-temperature cofired ceramic material may further contain, as an accessory constituent ceramic material, 0.1 to 5.0 parts by weight of Co and/or V respectively in terms of CoO and $V_2O_5$ with respect to 100 parts by weight of the main constituent ceramic material. These constituents can further improve the bending strength of a multilayer ceramic substrate obtained, and also serve as a colorant.

In order to produce a ceramic sintered body according to this invention, preferably, ceramic green sheets are first prepared which include a non-glass low-temperature cofired ceramic material including: a main constituent ceramic material containing an Si oxide, a Ba oxide, and an Al oxide; and an accessory constituent ceramic material containing an Mn oxide and a Ti oxide, and substantially no Cr oxide and B oxide.

Next, the step of stacking the multiple ceramic green sheets to prepare a raw laminated body and the step of firing the raw laminated body are carried out. In this firing step, the maximum temperature is controlled in the range of 980 to 1000° C.

The firing at the maximum temperature in the range as mentioned above can promote the precipitation of a fresnoite crystal phase. Therefore, the crystal precipitation ratio between quartz and fresnoite can be controlled in a desired manner in order to increase the fracture toughness value of the ceramic sintered body obtained.

Next, a multilayer ceramic substrate configured with the use of the ceramic sintered body according to this invention, and a method for producing the multilayer ceramic substrate, are described with reference to an embodiment shown in the FIGURE.

FIG. 1 is a cross-sectional view schematically illustrating a multilayer ceramic substrate 1 configured with the use of a ceramic sintered body according to this invention.

The multilayer ceramic substrate 1 includes a laminated body 3 composed of a plurality of stacked ceramic layers 2. The ceramic layers 2 included in the laminated body 3 are composed of the ceramic sintered body according to this invention. This laminated body 3 is provided with various conductor patterns in connection with specific ones of the ceramic layers 2.

The conductor patterns mentioned above can include several external conductor films 4 and 5 formed on the end surfaces in the stacking direction of the laminated body 3, several internal conductor films 6 formed along the specific interfaces between the ceramic layers 2, and via hole conductors 7 formed so as to penetrate through specific ones of the ceramic layers 2, which function as interlayer connection conductors.

The external conductor films 4 provided on the surface of the laminated body 3 are used for connection to electronic components 8 and 9 mounted on the outer surface of the laminated body 3. FIG. 1 illustrates the electronic component 8 including bump electrodes 10, for example, contacting a semiconductor device, and the electronic component 9 including planar terminal electrodes 11, for example, contacting a chip capacitor. In addition, the external conductor films 5 provided on the back surface of the laminated body 3 are used for connection to a mother board (not shown) on which this multilayer ceramic substrate 1 is to be mounted.

The laminated body 3 included in this multilayer ceramic substrate 1 is obtained by firing a raw laminated body including: a plurality of stacked ceramic green layers, which are to serve as the ceramic layers 2; and the internal conductor films 6 and via hole conductors 7 formed from a conductive paste, and in some cases, further including the external conductor films 4 and 5 formed from a conductive paste.

The stacked structure of the ceramic green layers in the raw laminated body described above is typically achieved by stacking a plurality of ceramic green sheets obtained through the formation of ceramic slurry into a shape, and the conductor patterns, in particular, the internal conductor patterns are provided on the ceramic green sheets before the stacking.

The ceramic slurry can be obtained by the addition of an organic binder such as polyvinyl butyral, a solvent such as toluene and isopropyl alcohol, a plasticizer such as di-n-butyl phthalate, and if necessary, other additives such as a dispersant, to a low-temperature cofired ceramic material.

In the shape formation for obtaining the ceramic green sheets with the use of the ceramic slurry, for example, on a carrier film composed of an organic resin such as polyethylene terephthalate, a doctor blade method is applied to form the ceramic slurry into the shape of a sheet.

For providing the conductor patterns on the ceramic green sheets, a conductive paste is used which contains, as a main constituent of the conductive component, a low melting point metal material such as gold, silver, or copper, through-holes for the via hole conductors 7 are provided in the ceramic green sheets, the through-holes are filled with the conductive paste, and conductive paste films for the internal conductor films 6 and conductive paste films for the external conductor films 4 and 5 are formed by, for example, a screen printing method. It is to be noted that the ceramic sintered body according to this invention is superior in terms of simultaneous sinterability with, in particular, a conductive paste containing copper as its main constituent, among low melting point metal materials of gold, silver, or copper.

The ceramic green sheets are stacked in a predetermined order, and subjected to pressure bonding with a pressure of, for example, 1000 to 1500 kgf/cm² applied in the stacking direction to provide a raw laminated body. The raw laminated body may be provided with, not shown, a cavity for housing other electronic components, and with a junction for fixing a cover covering the electronic components 8 and 9.

Next, the raw laminated body is subjected to firing at the maximum temperature in the range of 980 to 1000° C. This firing makes the ceramic green layers sinter, and also makes the conductive paste sinter, thereby forming a circuit pattern with the sintered conductor films. Then, as is determined from experimental examples described later, respective crystal phases of quartz, alumina, fresnoite, sanbornite, and celsian are precipitated in the ceramic sintered body constituting the sintered ceramic layers 2, the relationship between the diffraction peak intensity A in the (201) plane of the fresnoite and the diffraction peak intensity B in the (110) plane of the quartz, measured by a powder X-ray diffractometry in the range of the diffraction peak angle $2\theta=10$ to $40°$, is A/B≥2.5.

Further, in particular, when the main constituent metal contained in the conductor patterns is copper, the firing is carried out in a non-oxidizing atmosphere such as a nitrogen atmosphere, for example, in such a way that the removal of the binder is completed at a temperature of 900° C. or less, and the copper is not substantially oxidized at the completion of the firing by decreasing the oxygen partial pressure with decrease in temperature. Since the firing temperature is, for example, 980° C. or more, it is difficult to use silver as the metal contained in the conductor patterns, while it is possible to use, for example, an Ag—Pd based alloy containing 20 weight % or more of palladium. In this case, the firing can be carried out in air.

As described above, when the firing step is completed, the laminated body 3 shown in FIG. 1 is obtained.

Thereafter, the electronic components 8 and 9 are mounted, thereby completing the multilayer ceramic substrate 1 shown in FIG. 1.

While the ceramic layers 2 in the multilayer ceramic substrate 1 described above contain no glass as a starting constituent as mentioned previously, glass as an amorphous component is produced during the firing cycle, and the fired ceramic layers 2 thus contain glass. Therefore, the multilayer ceramic substrate 1 can be prepared in a stable manner without the use of expensive glass.

It is to be noted that the ceramic sintered body according to this invention is preferably applied to multilayer ceramic substrates including the laminated body which has a stacked structure as described above, but can be also applied to ceramic substrates which have a single layer structure, i.e., simply having one ceramic layer. In addition, the ceramic sintered body according to this invention can be also applied to composite-type multilayer ceramic substrates including low dielectric constant ceramic layers composed of the ceramic sintered body and high dielectric constant ceramic layers composed of another ceramic sintered body with a relatively high relative permittivity $\in_r$ (for example, $\in_r$ of 15 or more).

Next, experimental examples will be described below, which were carried out in accordance with this invention.

EXPERIMENTAL EXAMPLE 1

(1) Preparation of Ceramic Green Sheet

First, respective ceramic powders of $SiO_2$, $BaCO_3$, $Al_2O_3$, $MnCO_3$, $TiO_2$, and $Mg(OH)_2$, each being 2.0 µm or less in grain size, were prepared as starting raw materials. Next, these starting raw material powders were weighed so as to provide the composition shown in Table 1 after firing, subjected to wet mixing and grinding, and then to drying, and the obtained mixtures were subjected to calcination at 750 to 1000° C. for 1 to 3 hours to obtain raw material powders. The $BaCO_3$ is turned into BaO after the firing, the $MnCO_3$ is turned into MnO after the firing, and the $Mg(OH)_2$ is turned into MgO after the firing.

It is to be noted that in Table 1, the main constituent ceramic material of $SiO_2$, BaO, and $Al_2O_3$, as well as the accessory constituent ceramic material of MnO, $TiO_2$, and MgO are shown in terms of weight %, and the total of all of these materials accounts for 100 weight %.

TABLE 1

|  | Main Constituent Ceramic Material | | | Accessory Constituent Ceramic Material | | |
| --- | --- | --- | --- | --- | --- | --- |
|  | $SiO_2$ | BaO | $Al_2O_3$ | MnO | $TiO_2$ | MgO |
| Weight % | 53.0 | 27.0 | 11.0 | 5.0 | 2.0 | 2.0 |

Next, appropriate amounts of organic binder, dispersant, and plasticizer were added to the raw material powders according to the respective samples to prepare a ceramic slurry, and the ceramic slurry was then subjected to mixing and grinding so as to provide an average grain size (D50) of 1.5 µm or less for the raw material powder in the slurry.

The ceramic slurry was then formed into a sheet by a doctor blade method, dried, and cut into an appropriate size to obtain ceramic green sheets of 50 µm in thickness.

(2) Preparation of Raw Laminated Body Sample

After cutting the obtained ceramic green sheets into a predetermined size, multiple sheets were stacked, and then subjected to thermocompression bonding under the conditions of temperature: 60 to 80° C. and pressure: 1000 to 1500 kg/cm², thereby providing raw laminated bodies. Then, the raw laminated bodies were cut to have a laminated body size of 30.0 mm×4.5 mm×1.0 mm (thickness) after firing.

(3) Firing of Laminated Body Sample

Next, the raw laminated bodies subjected to the cutting were subjected to firing in a non-oxidizing atmosphere of nitrogen-hydrogen at the maximum temperature in the range of 970 to 1050° C. for the maximum temperature holding time in the range of 30 to 480 minutes as shown in Table 2, thereby providing sintered plate-like ceramic substrate samples.

(4) Evaluation of Substrate Sample Strength

The flexural strengths of the ceramic substrate samples were evaluated by a three-point bending test (JIS-R1061).

(5) Confirmation of Crystal Phases Precipitated in Substrate Sample

The ceramic substrate samples were powdered, and the precipitated crystals were identified from diffraction peaks measured by an X-ray diffraction method in the range of the diffraction peak angle $2\theta=10$ to $40°$ to confirm the precipitation of at least quartz ($SiO_2$), alumina ($Al_2O_3$), fresnoite ($Ba_2TiSiO_8$), sanbornite ($BaSi_2O_5$), and celsian ($BaAl_2Si_2O_8$) as the precipitated crystal phases in the substrate samples.

Then, the relationship of A/B was calculated from the diffraction peak intensity A in the (201) plane of the fresnoite crystal and the diffraction peak intensity B in the (110) plane of the quartz crystal.

(6) Measurement of Crystal Grain Size Precipitated in Substrate Sample

The ceramic substrate samples were subjected to polishing so that cross sections thereof were exposed, the grain sizes for the precipitated fresnoite were measured at 10 points with the use of a scanning microscope, and the averaged value were regarded as the average grain size. For the identification of fresnoite, crystals in which the most segregation of the constituent elements (Ba, Si, Ti, O) of fresnoite was observed were determined as fresnoite from an elemental mapping analysis by a transmission microscope.

The results of the flexural strength, A/B ratio, and fresnoite average grain size respectively obtained in the above sections (4), (5), and (6) are shown in Table 2.

TABLE 2

| Sample Number | Maximum Firing Temperature (° C.) | Maximum Temperature Holding Time (min) | Flexural Strength (MPa) | A/B Ratio | Fresnoite Average Grain Size (μm) |
|---|---|---|---|---|---|
| 1* | 970 | 30 | 209 | 1.61 | 1.89 |
| 2* | 970 | 60 | 235 | 1.86 | 2.31 |
| 3* | 970 | 120 | 249 | 1.98 | 2.53 |
| 4* | 970 | 240 | 260 | 2.09 | 2.65 |
| 5* | 970 | 480 | 283 | 2.35 | 2.70 |
| 6 | 980 | 30 | 320 | 2.58 | 2.71 |
| 7 | 980 | 60 | 324 | 2.77 | 3.00 |
| 8 | 980 | 120 | 330 | 2.94 | 3.39 |
| 9 | 980 | 240 | 344 | 3.21 | 4.50 |
| 10 | 980 | 480 | 315 | 3.25 | 5.09 |
| 11 | 990 | 30 | 332 | 3.02 | 3.11 |
| 12 | 990 | 60 | 342 | 3.26 | 3.51 |
| 13 | 990 | 120 | 355 | 3.39 | 3.89 |
| 14 | 990 | 240 | 357 | 3.49 | 4.81 |
| 15 | 990 | 480 | 306 | 3.50 | 5.25 |
| 16 | 1000 | 30 | 321 | 2.86 | 2.85 |
| 17 | 1000 | 60 | 334 | 3.05 | 3.28 |
| 18 | 1000 | 120 | 342 | 3.18 | 3.62 |
| 19 | 1000 | 240 | 345 | 3.20 | 4.15 |
| 20 | 1000 | 480 | 310 | 3.20 | 5.05 |
| 21* | 1050 | 30 | 269 | 2.38 | 3.50 |
| 22* | 1050 | 60 | 184 | 2.20 | 3.19 |
| 23* | 1050 | 120 | 236 | 2.07 | 3.01 |
| 24* | 1050 | 240 | 218 | 1.91 | 2.89 |
| 25* | 1050 | 480 | 195 | 1.60 | 2.70 |

In Table 2, the sample numbers with a symbol * refer to samples outside the scope of this invention.

In the case of samples 6 to 20, the maximum firing temperature was adjusted to the range of 980 to 1000° C. results in A/B≥2.5, thereby achieving ceramic substrates with a flexural strength of 300 MPa or more. In addition, the increase of the maximum firing holding time has a tendency to increase the A/B ratio and thereby improve the flexural strength. It is assumed that more precipitation of fine-grained fresnoite compared with the other crystals makes it less likely to extend fracture cracks, resulting in an improvement in substrate strength.

In addition, it is seen in the case of samples 6 to 9, 11 to 14, and 16 to 20, that ceramic substrates with a flexural strength of 320 MPa or more are achieved with the average grain size of the precipitated fresnoite crystal being less than 5 μm. It is assumed that the fine-grained fresnoite increases the number of crystal grain boundaries to enhance the effect of suppressing the crack extension, and thereby further improve the substrate strength.

In contrast to these samples, the maximum firing temperature was decreased down to 970° C. as in the case of samples 1 to 5, or the maximum firing temperature was increased up to 1050° C. as in the case of samples 21 to 25, and resulted in an A/B of less than 2.5, and in a decreased flexural strength less than 300 MPa. It is believed that this is because of insufficient precipitation of fresnoite crystals, or a promoted reaction of fresnoite crystals changed into an amorphous component.

EXPERIMENTAL EXAMPLE 2

(1) Preparation of Ceramic Green Sheet

As in the case of Experimental Example 1, first, respective ceramic powders of $SiO_2$, $BaCO_3$, $Al_2O_3$, $MnCO_3$, $TiO_2$, and $Mg(OH)_2$, each of 2.0 μm or less in grain size, were prepared as starting raw materials. Next, these starting raw material powders were weighed so as to provide the composition ratios shown in Table 3 after firing, and subjected to wet mixing and grinding, and then to drying, and the obtained mixtures were subjected to calcination at 750 to 1000° C. for 1 to 3 hours to obtain raw material powders.

TABLE 3

| Sample Number | Main Constituent Ceramic Material | | | Accessory Constituent Ceramic Material | | |
|---|---|---|---|---|---|---|
| | $SiO_2$ | BaO | $Al_2O_3$ | MnO | $TiO_2$ | MgO |
| 26 | 53.0 | 27.0 | 11.0 | 5.0 | 0.5 | 3.5 |
| 27 | 53.0 | 27.0 | 11.0 | 5.0 | 1.0 | 3.0 |
| 13 | 53.0 | 27.0 | 11.0 | 5.0 | 2.0 | 2.0 |
| 28 | 52.1 | 26.6 | 10.8 | 4.5 | 4.0 | 2.0 |
| 29 | 48.8 | 24.8 | 10.1 | 4.5 | 10.0 | 1.8 |

Unit: weight %

In Table 3, sample 13 is equivalent to sample 13 in Experimental Example 1.

Next, ceramic green sheets were obtained in the same way as in the case of Experimental Example 1.

(2) Preparation of Raw Laminated Body Sample

Next, raw laminated bodies were obtained in the same way as in the case of Experimental Example 1.

(3) Firing of Laminated Body Sample

The raw laminated bodies after cutting were subjected to firing in a non-oxidizing atmosphere of nitrogen-hydrogen at the maximum temperature of 990° C. and for the maximum temperature holding time of 120 minutes, thereby providing sintered plate-like ceramic substrate samples.

(4) Evaluation of Substrate Sample Strength

As in the case of Experimental Example 1, the flexural strengths of the ceramic substrate samples were evaluated by a three-point bending test (JIS-R1061).

(5) Confirmation of Crystal Phases Precipitated in Substrate Sample

As in the case of Experimental Example 1, the ceramic substrate samples were powdered, and the precipitated crystals were identified from diffraction peaks measured by an X-ray diffraction method in the range of the diffraction peak angle 2θ=10 to 40° to confirm the precipitation of at least quartz ($SiO_2$), alumina ($Al_2O_3$), fresnoite ($Ba_2TiSiO_8$), sanbornite ($BaSi_2O_5$), and celsian ($BaAl_2Si_2O_8$) as the precipitated crystal phases in the substrate samples, and the relationship of A/B was calculated from the diffraction peak intensity A in the (201) plane of the fresnoite crystal and the diffraction peak intensity B in the (110) plane of the quartz crystal.

The results of the flexural strength and A/B ratio respectively obtained in the above sections (4) and (5) are shown in Table 4.

TABLE 4

| Sample Number | Flexural Strength (MPa) | A/B Ratio |
|---|---|---|
| 26 | 321 | 2.85 |
| 27 | 328 | 3.01 |

TABLE 4-continued

| Sample Number | Flexural Strength (MPa) | A/B Ratio |
| --- | --- | --- |
| 13 | 355 | 3.39 |
| 28 | 359 | 3.48 |
| 29 | 364 | 3.59 |

Table 4 also shows the evaluation result of sample 13 in Experimental Example 1.

As is clear from comparison among samples 13 and 26 to 29, the increased $TiO_2$ additive amount further increases the A/B ratio, thereby further increasing the flexural strength. This is assumed to be the result of the increased $TiO_2$ additive amount promoting the precipitation of fresnoite, thereby improving the flexural strength.

| DESCRIPTION OF REFERENCE SYMBOLS | |
| --- | --- |
| 1 | multilayer ceramic substrate |
| 2 | ceramic layer |
| 3 | laminated body |

The invention claimed is:

1. A ceramic sintered body comprising respective crystal phases of quartz, alumina, fresnoite, sanbornite, and of celsian, wherein the relationship between a diffraction peak intensity A in a (201) plane of the fresnoite and a diffraction peak intensity B in a (110) plane of the quartz, measured by a powder X-ray diffractometry in the range of a diffraction peak angle 2θ=10 to 40°, is A/B≥2.5, and wherein the ceramic sintered body is a sintered non-glass low-temperature cofired ceramic material consisting essentially of a main constituent ceramic material Si oxide, Ba oxide, and Al oxide; and an accessory constituent ceramic material consisting essentially of Mn oxide and Ti oxide, and containing substantially no Cr oxide or B oxide.

2. The ceramic sintered body according to claim 1, wherein the fresnoite crystal phase has an average crystal grain size of 5 μm or less.

3. The ceramic sintered body according to claim 2, wherein the non-glass low-temperature cofired ceramic material main constituent ceramic material comprises 48 to 75 wt % Si in terms of $SiO_2$, 20 to 40 wt % Ba in the form of BaO, and 5 to 20 wt % Al in the form of $Al_2O_3$; and the accessory constituent ceramic material comprises 2 to 10 weight parts per hundred weight parts of the main constituent of Mn in the form of MnO and 0.1 to 10 weight parts per hundred weight parts of the main constituent of Ti in the form of $TiO_2$.

4. The ceramic sintered body according to claim 3, wherein the non-glass low-temperature cofired ceramic material is free of alkali metal oxides.

5. The ceramic sintered body according to claim 1, wherein the non-glass low-temperature cofired ceramic material main constituent ceramic material comprises 48 to 75 wt % Si in terms of $SiO_2$, 20 to 40 wt % Ba in the form of BaO, and 5 to 20 wt % Al in the form of $Al_2O_3$; and the accessory constituent ceramic material comprises 2 to 10 weight parts per hundred weight parts of the main constituent of Mn in the form of MnO and 0.1 to 10 weight parts per hundred weight parts of the main constituent of Ti in the form of $TiO_2$.

6. The ceramic sintered body according to claim 5, wherein the non-glass low-temperature cofired ceramic material is free of alkali metal oxides.

7. A laminate comprising at least two layers in which one layer comprises a ceramic sintered body comprising respective crystal phases of quartz, alumina, fresnoite, sanbornite, and of celsian, wherein the relationship between a diffraction peak intensity A in a (201) plane of the fresnoite and a diffraction peak intensity B in a (110) plane of the quartz, measured by a powder X-ray diffractometry in the range of a diffraction peak angle 2θ=10 to 40°, is A/B≥2.5, and wherein the ceramic sintered body is a sintered non-glass low-temperature cofired ceramic material consisting essentially of a main constituent ceramic material Si oxide, Ba oxide, and Al oxide; and an accessory constituent ceramic material consisting essentially of Mn oxide and Ti oxide, and containing substantially no Cr oxide or B oxide.

8. A laminate according to claim 7 in which the ceramic sintered body fresnoite crystal phase has an average crystal grain size of 5 μm or less.

* * * * *